US011773760B2

(12) United States Patent
Scanlon, Sr.

(10) Patent No.: US 11,773,760 B2
(45) Date of Patent: Oct. 3, 2023

(54) OVERLAPPING VANE MUFFLER

(71) Applicant: U.S. Army Combat Capabilities Development Command, Army Research Labortary, Adelphi, MD (US)

(72) Inventor: Michael V. Scanlon, Sr., Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 385 days.

(21) Appl. No.: 16/893,465

(22) Filed: Jun. 5, 2020

(65) Prior Publication Data

US 2021/0172355 A1   Jun. 10, 2021

Related U.S. Application Data

(60) Provisional application No. 62/943,828, filed on Dec. 5, 2019.

(51) Int. Cl.
*F01N 1/12* (2006.01)
*G10K 11/162* (2006.01)

(52) U.S. Cl.
CPC .............. *F01N 1/12* (2013.01); *G10K 11/162* (2013.01)

(58) Field of Classification Search
CPC . F01N 1/087; F01N 1/088; F01N 1/12; F01N 1/086; G10K 11/162
See application file for complete search history.

(56) References Cited

U.S. PATENT DOCUMENTS

| | | | | |
|---|---|---|---|---|
| 1,680,775 A * | 8/1928 | Faber | .................... | F04D 29/483 415/154.1 |
| 2,841,235 A * | 7/1958 | Curioni | .................... | F01N 1/12 181/280 |
| 3,672,773 A * | 6/1972 | Moller | ....................... | F01N 3/06 181/256 |
| 3,927,731 A * | 12/1975 | Lancaster | ............... | F01N 1/125 181/256 |
| 5,388,407 A * | 2/1995 | Capers | ...................... | F01N 3/20 60/323 |
| 6,089,347 A * | 7/2000 | Flugger | ................... | F01N 1/089 181/275 |
| 6,364,054 B1 * | 4/2002 | Bubulka | ................. | F01N 1/083 181/282 |
| 6,959,782 B2 * | 11/2005 | Brower | .................... | F01N 1/086 60/314 |
| 8,104,572 B2 * | 1/2012 | Butler | ..................... | F01N 1/087 181/279 |
| 8,256,571 B1 * | 9/2012 | Butler | ..................... | F01N 1/083 181/275 |
| 8,746,401 B2 * | 6/2014 | Butler | ....................... | F01N 1/08 181/275 |
| 9,587,536 B2 * | 3/2017 | Belt | .......................... | F01N 1/08 |

(Continued)

*Primary Examiner* — Jeremy A Luks
(74) *Attorney, Agent, or Firm* — Alan I. Kalb

(57) ABSTRACT

Apparatus for attenuating a sound level comprising an enclosure having an inlet and an outlet, where an exhaust flow director is positioned within the enclosure and fluidly coupled to the inlet and the outlet. The exhaust flow director comprises a plurality of overlapping vanes that directs the exhaust flow to attenuate the level of the sound produced by the exhaust.

1 Claim, 12 Drawing Sheets

(56) References Cited

U.S. PATENT DOCUMENTS

| | | | |
|---|---|---|---|
| 2005/0220640 A1* | 10/2005 | Finkenbinder | F04D 29/664 417/423.1 |
| 2013/0105244 A1* | 5/2013 | Moreton Cesteros | H04R 1/2873 181/199 |
| 2014/0338328 A1* | 11/2014 | Lusardi | F01D 9/047 60/605.2 |

* cited by examiner

OVERLAPPING VANE MUFFLER

RELATED APPLICATION

This application claims benefit to U.S. Provisional Patent Application Ser. No. 62/943,828 filed Dec. 5, 2019 entitled "Overlapping Vane Muffler," which is hereby incorporated herein in its entirety.

GOVERNMENT INTEREST

The invention described herein may be manufactured, used and licensed by or for the U.S. Government.

BACKGROUND

Field of the Invention

Embodiments of the present invention generally relate to mufflers for attenuating loud sound levels and, more specifically, to a muffler with an overlapping vane structure.

Description of the Related Art

Traditional expansion mufflers for attenuating loud sounds produced by machinery, engines, equipment and the like have been available for a long time without much change in technology. These mufflers rely on rapid expansion of exhaust gasses into chambers that are interconnected with pipes. The muffler features of length, volume, area, number of chambers and impedance help create the sound attenuation. Energy is converted to heat, and each successive expansion and contraction helps to reduce the peak amplitude and elongate the duration of each exhaust pulsation. Additional attenuation can be derived from perforated materials with fiberglass batting materials to absorb additional energy.

Therefore, there is a need in the art for new designs of mufflers to produce improved sound attenuation for a given muffler size as compared to a traditional expansion muffler.

SUMMARY

Embodiments of the present invention generally include apparatus for attenuating loud sound levels comprising an enclosure having an inlet and an outlet, where an exhaust flow director is positioned within the enclosure and fluidly coupled to the inlet and the outlet. The exhaust flow director comprises a plurality of overlapping vanes that directs the exhaust flow to attenuate the level of the sound produced by the exhaust.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
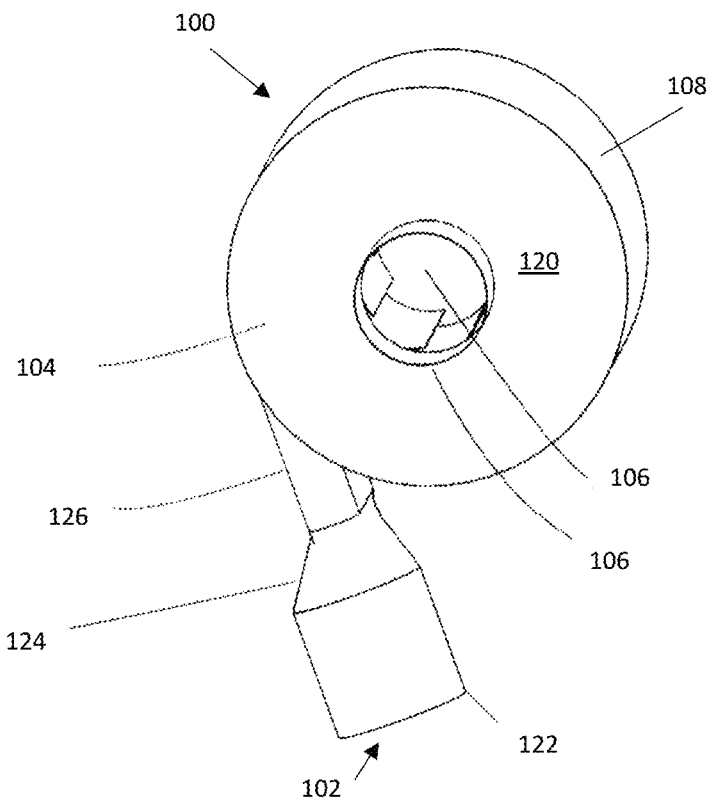
FIG. 1 depicts a perspective view of one embodiment of the inventive muffler.

Embodiments of the invention include a muffler comprising an enclosure having an inlet and an outlet, with an exhaust flow director positioned between the inlet and outlet. The term exhaust is defined and used herein as a broad term to encompass acoustic (sound) and fluid flow emanating from a machine. Embodiments of the muffler can be used to attenuate sound levels in any type of machine including, but not limited to, internal combustion engines, turbines, pneumatic equipment, steam engines and the like. The fluid flow may encompass any fluid in which a sound may propagate including, but not limited to, exhaust gases, air, water, and the like. The sound emanating from a machine is primarily the result of pressure, flow, temperature and acoustic perturbations. These exhaust sounds have both acoustic and flow components with differing propagation velocities, amplitudes and frequency content. Flow implies a net displacement of matter with momentum, such as expanding gasses exiting a volume through a pipe, whereas an acoustic propagating wave is an energy transfer by percussions and rarefactions between adjacent molecules without any gross displacement of the molecules from the neutral position. The sound attenuating concepts described herein effect both the acoustic propagation direction, spectrum and amplitude, as well as the net flow through and around the components of the exhaust flow director used in embodiments of the invention.

In one embodiment, the exhaust flow director comprises a plurality of overlapping vanes that direct the flow of exhaust, including, as described above, both sound propagation and fluid flow. The exhaust flow director has many embodiments using the plurality of overlapping vanes to create vortices and/or cause exhaust to flow in counter flowing channels. The exhaust flow director perpetuates exhaust circulation within the muffler to attenuate the amplitude of exhaust pulsations as well as extend the duration of the pulsations. Consequently, embodiments of the invention substantially attenuate the sound level of the exhaust.

Embodiments of the invention can be used for quieting sound from engines, machinery and equipment. One application for embodiments of the invention is for internal combustion engines, which find use in, for example, vehicles, power generators, aircraft, lawn mowers, chain saws, blowers, and string trimmers. Embodiments of the invention can be used with any internal combustion engine of any size, i.e., any displacement or number of cylinders. Throughout this disclosure, embodiments of the invention are described with respect to an internal combustion engine application. This application should be considered an example of the many applications for embodiments of the invention. In other exemplary applications, embodiments can be used for reducing sound exposure for operators or workers to prevent hearing loss, or extend the amount of sound exposure time a worker can safely endure, and potentially remove the requirement for hearing protection to improve comfort and reduce safety concerns from exposure to loud sound levels from equipment or machinery.

To achieve sound attenuation, some embodiments prolong vorticity and circulation within one or more muffler chambers (vortex chambers) to create elongated flow paths, variable expansion regions, radial pressure gradients, varying angular velocity related to the radial extent of vortex motion, and resistance to uniform expansion due to diffraction within velocity gradients. The vortex chambers can be designed to keep noisy flows longer at the periphery of a circulation region due to centripetal acceleration and create pressure and flow gradients that inhibit transmission of sound through a vortex sink, i.e., the center of vortex motion or the eye of the vortex.

In these embodiments, the exhaust is typically introduced tangentially into a cylindrical chamber to create a vortex within the chamber walls, and the output port is usually a pipe with an opening at the center of the vortex. Continuous exhaust flow perpetuates and reinforces the vortex motion within the chamber. Sound, pressure, flow and temperature fluctuations of the entering exhaust flow are contained longer within the vortex motion, have an elongated path, merge with existing and future flow streams circulating in the vortex, and therefore have more opportunities to reduce these fluctuations before exiting the muffler section as compared to traditional expansion mufflers. This invention creates a circulation region where overlapping vane structures keep the flows circulating longer, so the effects of the attenuation principles described herein can be more effective and reducing noise; create larger transmission loss throughout the muffler's flow paths than traditional mufflers.

Figure 2:
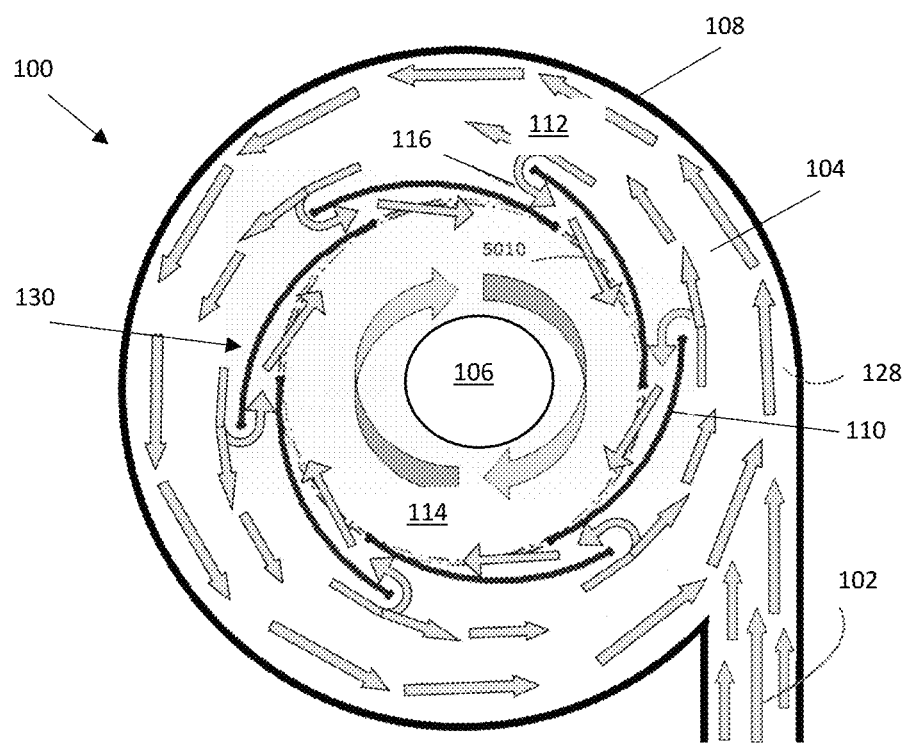
FIG. 2 depicts a cross-sectional view of the embodiment in FIG. 1 taken through the plane of the muffler.

FIG. 1 depicts a perspective view of one embodiment of the inventive muffler 100. FIG. 2 depicts a cross-sectional view of the embodiment in FIG. 1 taken through the plane of the muffler 100. To best understand the operation of this embodiment, both FIGS. 1 and 2 should be viewed while reading the following description.

FIGS. 1 and 2 depicts an apparatus (muffler) 100 having an exhaust inlet 102 at the periphery of an enclosure 104 and an exhaust outlet 106 centrally located in the enclosure 104. More specifically, FIGS. 1 and 2 depict the apparatus muffler 100 comprising a cylindrical enclosure 104 defined by side wall 108 and top and bottom elements 120 (only the annular bottom element 120 is shown). In one embodiment, the exhaust inlet 102 comprises an input pipe 122, a coupler 124 and a tangential injection plenum 126. In one embodiment, the input pipe 122, coupler and injection plenum are designed to establish the back pressure for the exhaust system. The tangential injection plenum is as tangential as possible to the interior surface 128 of side wall 108 to ensure vortex circulation is created within the enclosure as described below. Plenum size and enclosure diameter should eb chosen to produce maximum vorticity or circulation time within the enclosure such that pressure and flow fluctuations from the engine exhaust can be reduced due to the longer path lengths, centripetal acceleration and radial expansion of high-pressure pulsations.

Inlet 102 may be connected to the exhaust outlet of an internal combustion engine. In other embodiments, inlet 102 could also represent a transition path from a different section of a multi-stage muffler. Similarly, the final flow egress via outlet 106 could become the transition path to a subsequent stage of a muffler system with multiple chambers.

As depicted in FIG. 2, the enclosure 104 houses an exhaust flow director 130 comprising a plurality of curved vanes 110 arranged in a circular pattern within the interior of the enclosure 104. In the depicted embodiment, there are six vanes 110. The number and size of the vanes varies depending upon the amount of sound attenuation desired (i.e., more vanes for more attenuation) and the size of the muffler 100. The area between the vanes 110 and the side wall 108 is the first or outer circulation region 112, and in the depiction in FIG. 2, the direction of fluid rotation is counterclockwise (CCW), as shown by the arrows in region 112. The interior area formed inside these vanes 110 defines the second or inner circulation region 114, and in the depiction of FIG. 2, the resultant direction of fluid rotation is clockwise (CW), as depicted by the arrows in region 114. The resulting CW circulation in the second flow region 114 is a result of fluid in the first outer circulation region 112 reversing direction as it is forced into the gap region 116 formed between two adjacent vanes 110. This transition of flow from the first circulation region 112 into the second circulation region 114 occurs in the six symmetrical gaps 116. Vortex circulation is maintained in the inner circulation region 114 as long as there is sufficient circulation in the outer circulation region 112. A steady-state flow equilibrium can exist when the input and output flow is matched. There is no requirement that every gap needs to be symmetrical or uniform, and many combinations of vane sizes, shape, separation, distance and angular position relative to adjacent fins can create any number of gap proportions.

More specifically, the inlet port 102 shows flow vectors entering region 104 tangentially in a CCW rotation predominantly along an interior surface 128 of wall 108. The tangential insertion of flow along the inside wall perimeter will exploit centripetal acceleration to force the majority of flow and pressure expansion radially outward to follow the interior surface 128 as the flow progresses around the perimeter. Vane 110 will further deflect flow and pressure pulsations radially outward toward the outer perimeter of region 112, and because of the six overlapping duplicates of vane 110, the gaps 116 have a higher input impedance to flow and pressure pulses due to the requirement for the flow to change direction and flow through the gap 116 in an opposite CW rotation. The flow path of least resistance is to continue CCW in region 112 and let momentum, centripetal acceleration and reflections continue to force the flow and pressure perturbations radially outward along the inside of wall 108.

A radial region of vorticity is established; a gradient with higher pressure and lower angular velocity radially outward at the interior of wall 108, and lower pressure with higher angular velocity radially inward along the exterior of the overlapped vane-wall formed with six duplicates of vane 110 and gap 116.

The region of gap 116 shows the flow in region 112 having to reverse direction to enter into, and pass through, the gap 116 formed by two adjacent vanes 110. Once the flow passes through gap 116, it flows along the inside of vane 110, and combines with other flows entering the interior region 114 through the other five gaps that are similar to gap 116. These six CW rotating flows reinforce each other and form an interior vortex region 114 in the CW rotation direction (opposite to the outer circulation region 112 CCW rotation).

CW vortex circulation region 114 will also have an angular velocity and pressure gradient within the barrier created by the six vanes. Creating an egress path for the rotating flow through the outlet 106, will enable rotating flow to exit the muffler 100 to another section of a multi-stage muffler or to be released to the atmosphere.

Figure 3:
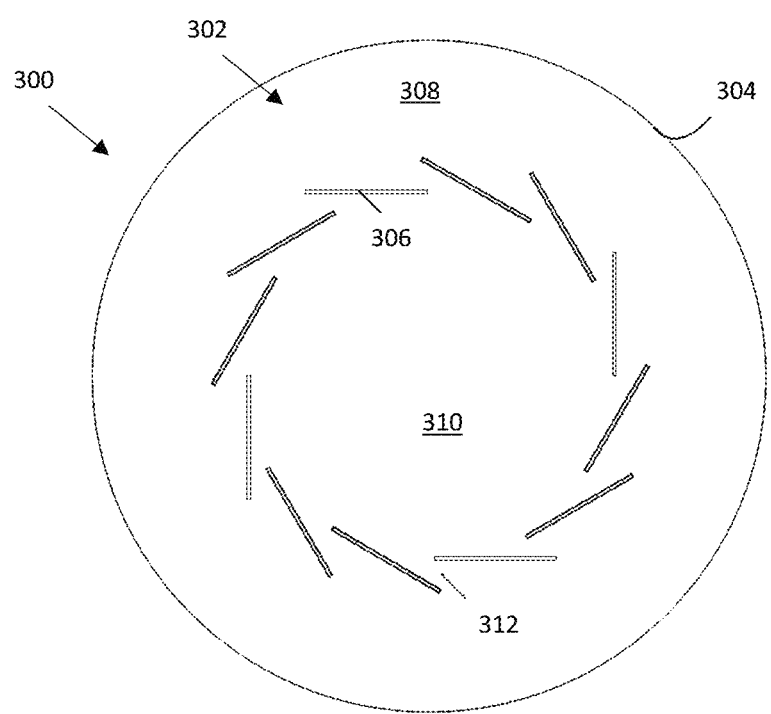
FIG. 3 depicts a muffler embodiment having an exhaust flow director comprising twelve flat overlapping vanes within a circular enclosure.

FIG. 3 depicts a muffler embodiment having an exhaust flow director comprising twelve flat overlapping vanes within a circular enclosure. More specifically, FIG. 3 depicts cross-sectional view of apparatus (muffler) 300 comprising a circular enclosure 302 defined by wall 304 and having a plurality of flat vanes 306 arranged in a circular pattern within the interior of the enclosure 302. In the depicted embodiment, there are twelve vanes. The number and size of the vanes varies depending upon the amount of sound attenuation desired (i.e., more vanes for more attenuation) and the size of the muffler 300. The area between the vanes 306 and the wall 304 is the first or outer circulation region 308, and in this depiction, the preferred direction of fluid rotation would be counterclockwise (CCW). The interior area formed inside these vanes is the second or inner circulation region 310, and in the depiction, the resultant direction of fluid rotation would be clockwise (CW). The resulting CW circulation in the inner circulation region 310 is a result of fluid in the first outer circulation region 308 reversing direction as it is forced into the gap region 312 formed between two adjacent vanes 306. This transition of flow from the first (outer) circulation region 308 into the second (inner) circulation region 310 occurs in the twelve symmetrical gaps 312. Vortex circulation is maintained in the inner circulation region 310 as long as there is sufficient circulation in the outer circulation region 308. A steady-state flow equilibrium can exist when the input and output flow is matched. There is no requirement that every gap needs to be symmetrical or uniform, and many combinations of vane sizes, shape, separation, distance and angular position relative to adjacent vanes can create any number of gap proportions.

Figure 4:
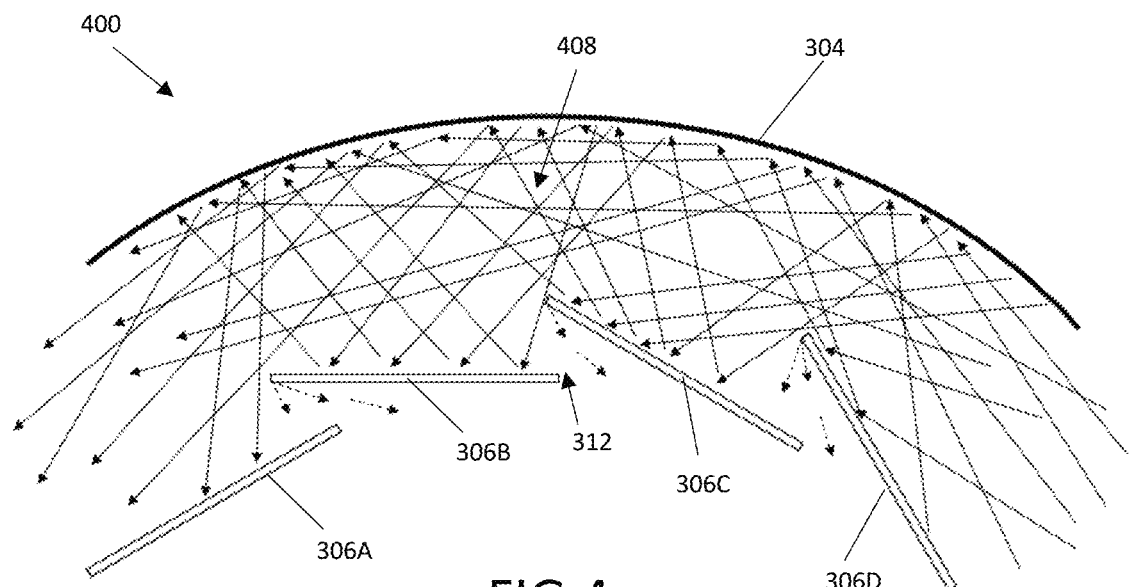
FIG. 4 depicts an acoustic ray tracing as a graphical depiction of sound propagation within circulation region and through a vane gap of the flat vane embodiment of FIG. 3.

FIG. 4 depicts an acoustic ray tracing 400 as a graphical depiction of sound propagation within circulation region 308 and through gap 312 of the flat vane embodiment of FIG. 3. This graphic assumes an expanding wavefront can be represented with a vector that is perpendicular to the progressing wavefront. The geometry of vanes are configured so that sounds prefer to be propagating in the outer circulation region 308 in a CCW rotation, and are predominantly contained between the outer wall 304 and the inner "barrier-wall" formed by straight vanes 306A, 306B, 306C and 306D. The geometry is designed to perpetuate CCW sound propagation in the region between the wall 304 and the four vanes shown, and to prevent or minimize any reflections and propagation in the CW rotation direction.

Gap 312 is formed between vanes 306B and vane 306C. With the straight fins shown, this gap has a larger input area and a smaller output area. Curved fins and relative orientations can create varying gap input profiles and impedances. Gap 312 shows that the majority of sound rays are reflected away from the gap 312 region; momentum carries the pressure pulses past the gap. However, some rays diffract around the downstream edges of the fins nearest to their respective gaps.

Figure 5:
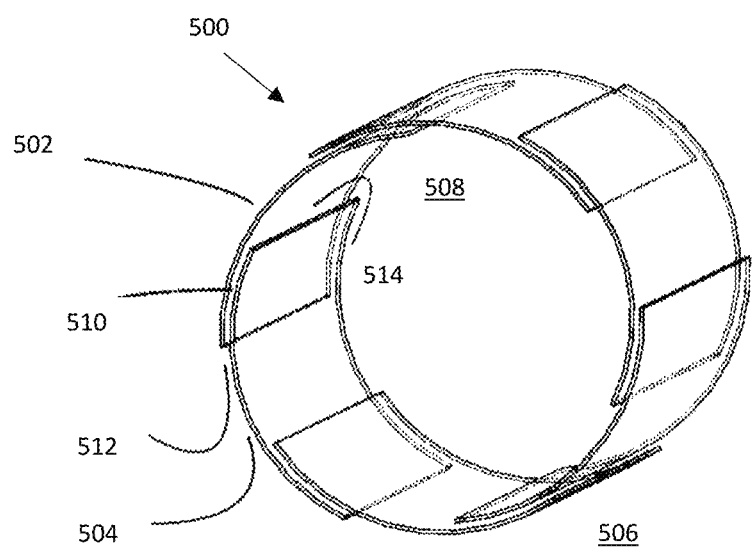
FIG. 5 depicts another embodiment of an exhaust flow director comprising curved, extruded vanes.

FIG. 5 depicts another embodiment of an exhaust flow director 500 comprising a set of curved extruded vanes 502 adjacent to a similar vane 504, and this embodiment shows six vanes equally spaced in a circular pattern. This assembly would be contained within an outer extruded wall, not shown in this figure, but similar to the outer wall 108 shown in FIG. 2. Outermost flow in this embodiment is CCW in outer circulation region 506, and CW in the inner circulation region 508. The gap 510 formed between adjacent vane 502 and vane 504 is shown as uniform in cross-sectional area; the flow area of inlet gap 512 and exit gap 514 during flow transition from the outer circulation region 506 into the inner circulation region 508 remains constant in this embodiment. The gap 510 area and the channel distance between inlet 512 and exit 514 determine the flow resistivity, and can be modified so that the sum of the six gaps 510 satisfy flow and backpressure requirements.

Figure 6:
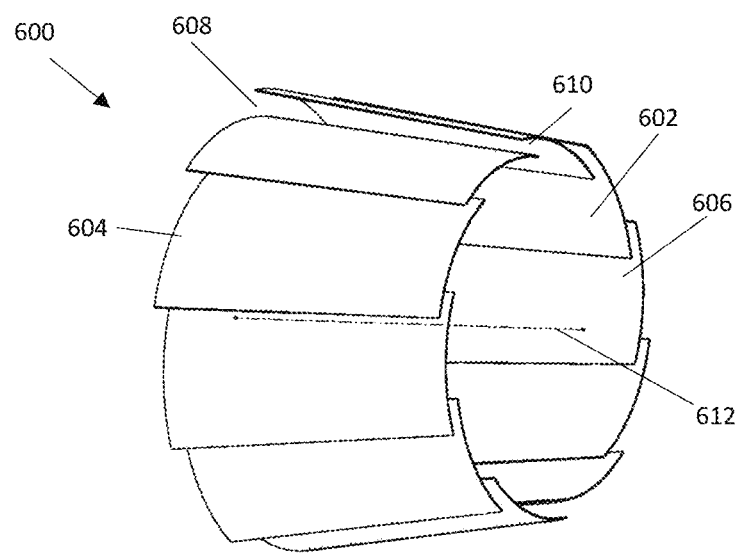
FIG. 6 depicts an embodiment of an exhaust flow director comprising circularly arranged curved vanes.

There can be advantages to having varying degrees of flow circulating outside of the overlapping vane structures. FIG. 6 depicts an embodiment of an exhaust flow director 600 comprising a plurality of curved vanes 602 circularly arranged around center line 612. Each vane 602 has a longer edge and larger radius-of-curvature at the end 604, and a shorter edge and smaller radius-of-curvature at the end 606. In the depicted embodiment, ten duplicates of vanes 602 are positioned to create both a gradually decreasing flow area from gap 608 to gap 610, and also a decreasing footprint (circumference of fin edges) from end 604 to end 606. Such a design, when inserted into a uniform cylindrical enclosure, provides less flow area (between cylinder and vanes) at end 604 and more flow area at end 606, thereby varying the flow-rates into the linearly changing gaps 608 and 610. The varying internal volume can have advantageous expansion and wave reflection properties.

Figure 7:
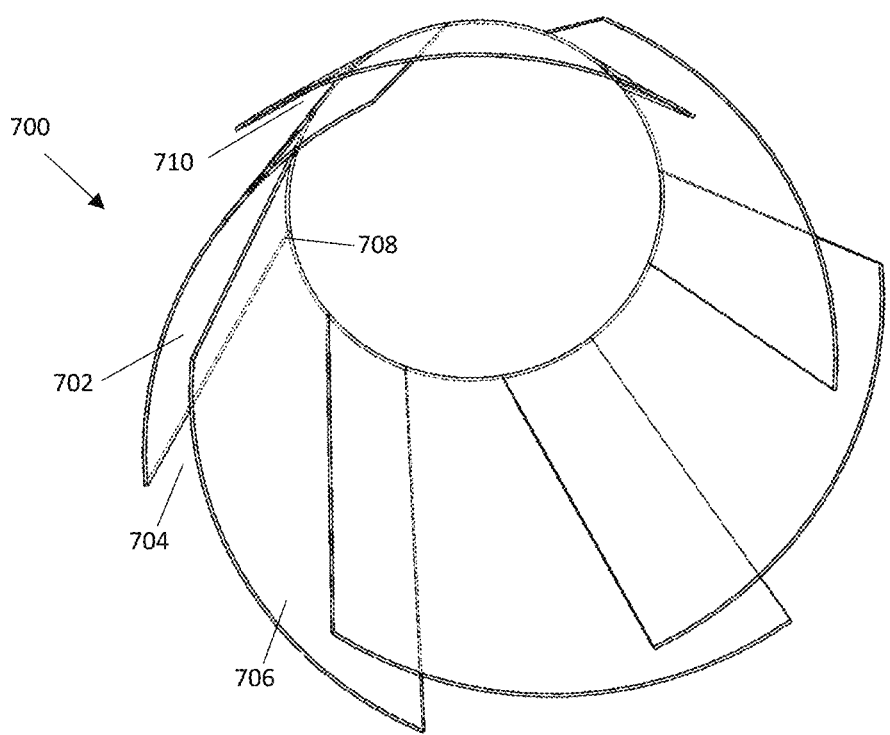
FIG. 7 depicts another embodiment of an exhaust flow director comprising gap tapered vanes.

FIG. 7 depicts another embodiment of an exhaust flow director 700 comprising a plurality of vanes 702 arranged to have a dramatic change in gap taper and circumferential apertures of opposing ends. A gap 704 is very wide at the large aperture end 706 of a vane 702, and it linearly decreases to a negligible gap 708 at the small aperture end 710. As described previously regarding FIG. 6, there can be advantages to varying the size of gaps, the location of gaps relative to input and output ports, and the extent of flow past the varying gap openings. The combination of gap area and overlap length can be configured to spatially vary the acoustic impedance and flow resistivity significantly within a device. This will help reduce acoustic emissions through destructive phase addition resulting from the integrated sum of the varying path lengths, acoustic impedances and regional diversity of pressure/flow reductions.

Figure 8:
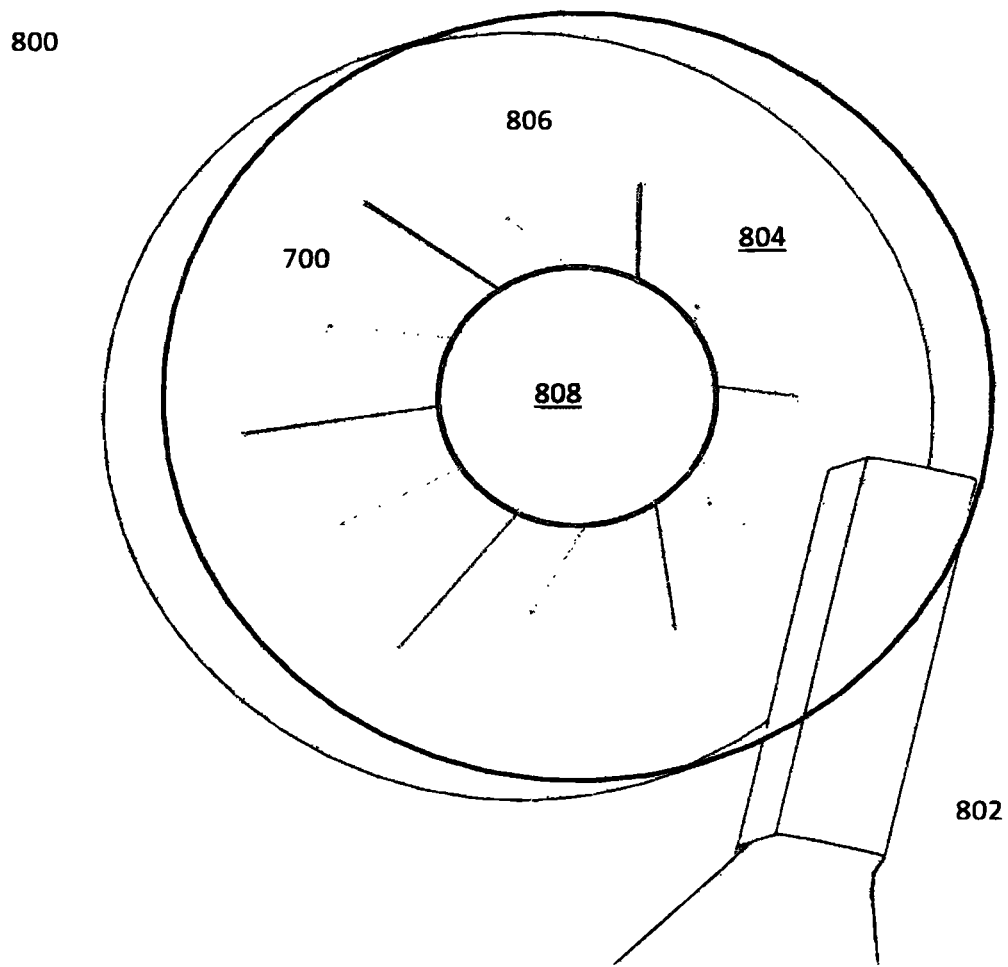
FIG. 8 depicts a muffler embodiment including the exhaust flow director of FIG. 7.

The tapered fin gaps and diverse apertures described with respect to FIG. 7 are depicted as part of the embodiment of muffler 800 of FIG. 8. An input plenum 802 tangentially introduces CCW exhaust flow into vorticity region 804, which advantageously passes exhaust flow director 700 in a manner to inhibit sound transmission into the linearly decreasing inlet area of gap 806. Once flow has migrated through the six gaps 806, it will reverse direction and reinforce a CW vortex within region 808.

In this embodiment, the exhaust exit path is not shown, but would be one or more pipes near the center-line of region 808; the number and locations of the egress pipe ports in the top element (not shown) to vent portions of the inner circulation region 808 at various pressure and velocity locations in the conical vortex field. The recombination of multiple, diversely sampled portions of the exhaust flow, provides additional sound reduction through phased and destructive interference. Alternatively, if multiple venting pipes are used for region 808 exhaust egress, they can individually be used to stimulate or maintain another vortex region in a different section of a multistage muffler. Alternatively, the multiple egress pipes can tangentially feed a single subsequent vortex chamber at various locations along the perimeter wall; random spacing or orientations will further cancel pressure fluctuations through phase mismatches and velocity averaging.

Figure 9:
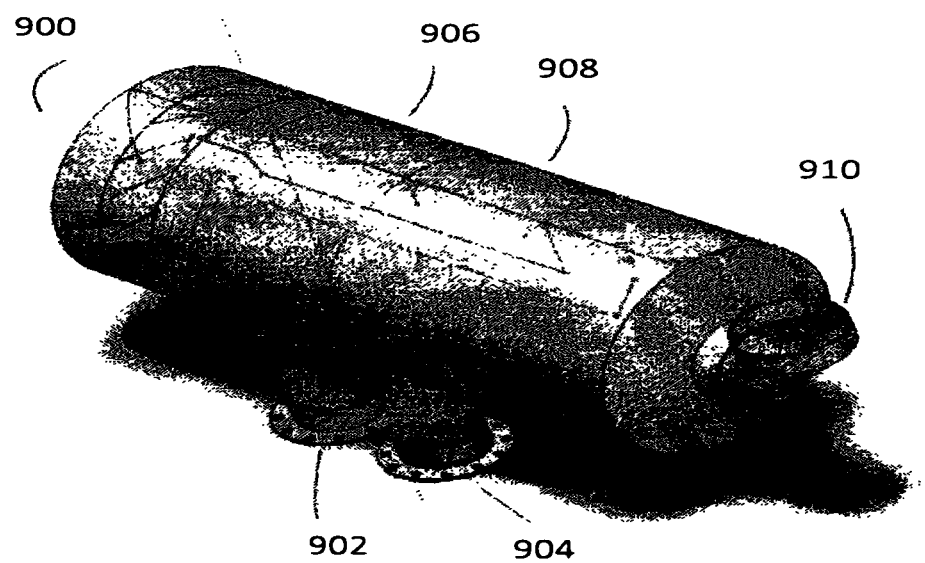
FIG. 9 depicts a perspective view of an embodiment of a muffler that has two exhaust inputs.

FIG. 9 depicts a perspective view of an embodiment of a muffler 900 that has two exhaust inputs 902 and 904 driving two overlapping vane sections 906 and 908, respectively. The two overlapping fin section are combined internally and exit the muffler through larger exhaust pipe 910.

Figure 10:
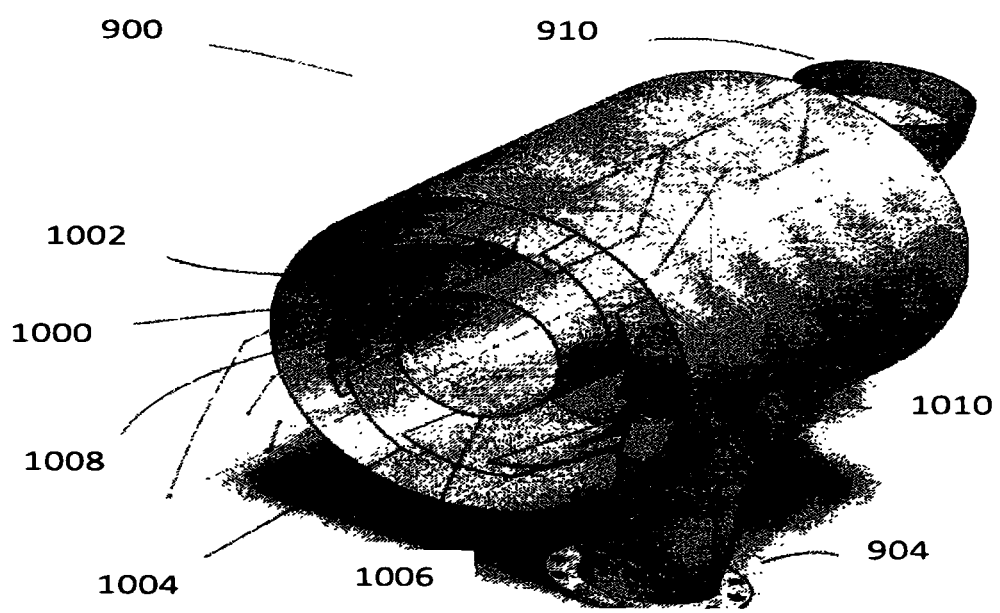
FIG. 10 depicts a cross sectional perspective view of half of the dual-input muffler of FIG. 9.

FIG. 10 depicts a cross sectional perspective view of half of the dual-input muffler 900 of FIG. 9. FIG. 10 reveals one exhaust input pipe 904 feeding CCW circulation region 1000 between outer wall 1002 and the barrier wall created by vanes 1004, an internal egress pipe 1006 creates an inner CW circulation region 1008 between pipe 1006 and the ten vanes 1004, and the muffler exhaust port 910.

Plenum 1010 tangentially introduced exhaust gasses into the circulation region 1000 along the interior of wall 1002. CCW circulation is contained between outer wall 1002 and overlapping vanes 1004; the exhaust changes direction to CW after passing through the ten fin gaps associated with vane assembly 1004. Once inside the vane assembly 1004, a CW vortex is created and maintained in the inner circulation region 1008. Flow eventually enters egress pipe 910 to transit to other portions of the muffler or to the muffler exhaust pipe 910.

Figure 11:
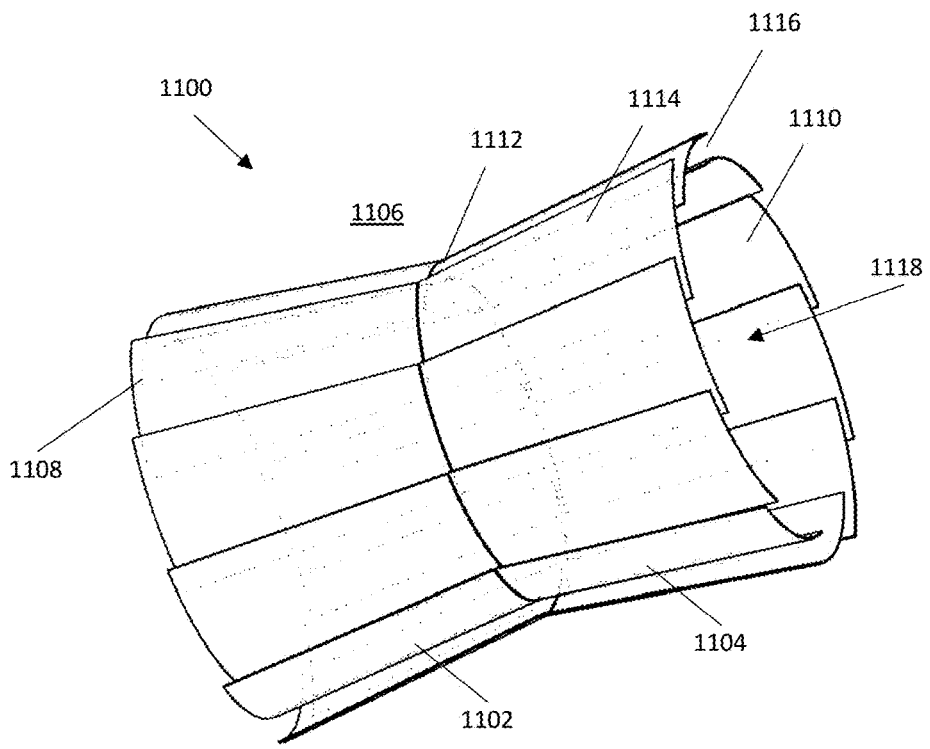
FIG. 11 depicts an embodiment of an exhaust flow director comprising twin overlapping vane assemblies.

FIG. 11 depicts an embodiment of an exhaust flow director 1100 having a structure comprising twin overlapping vane assemblies 1102 and 1104. As described previously with respect to FIG. 10, dual input exhaust flows can be introduced tangentially around the inside perimeter of a cylindrical wall that acts as, in this example, the outer shell of the muffler. For clarity, in FIG. 11, the outer wall of the muffler is not depicted. The tangential exhaust flows are significantly contained between the outer wall (not shown in this figure) and the twin overlapping vane assemblies 1102 and 1104. The flow perturbations and pressure pulsations tend to flow between the cylindrical outer wall (not shown) and the vane assemblies 1102 and 1104 to create a circulation channel region 1106. The circulation channel dimensions between the outer wall (not shown) at the vane assembly ends 1108 and 1110 are smaller than the channel dimensions located near the juncture 1112 of vane assemblies 1102 and 1104. This flow creates a vortex in the channel where the pressure gradient in the radial direction of 1106 is greatest at the outer shell and less at the twin overlapping vane assemblies 1102 and 1104.

Each vane assembly 1102 and 1104 comprise a plurality of vanes 1114 that are spaced from one another to form a gap 1116 between adjacent vanes. The gap 1116 between the vanes 1114 is shown as linearly varying in gap area between an assembly end 1108 and 1110 to the assembly junction 1112. In alternative embodiments, the gap 1116 can be uniform or complex. The combination of variable channel circulation area and vane gap area along the circulation channel region 1106 creates variable acoustic and flow input impedance into the interior circulation region 1118.

In the embodiment of FIG. 11, the twin inputs of exhaust gases would introduce the flows at the midpoint of each overlapping vane assembly 1102 and 1104. As a result of the tapered vane assemblies 1102 and 1104 with linearly varying gaps 1116 as shown, the pressures and flows can expand in both axial directions and rotationally, and interact with each other along the circulation channel. Alternatively, an interior separation ring (not shown) located at the junction 1112 of assemblies 1102 and 1104 could maintain the two inlet flows as separate and independent until they eventually flow into the internal circulation region 1118 to combine there. In this dual overlapping configuration, it is obvious that variations of number and shape of vanes, separation between vanes, uniform or variable gap areas, and the taper of the vanes can all be selected to optimize flow impedance and noise abatement.

The flow direction is preferably in the rotational direction that does not permit direct flow into the gap 1116 between the vanes 1114. However, in FIG. 11, the flow direction is out of the page on the top of the twin fin assemblies 1102 and 1104 and continuing downward in front of the assemblies. Both assemblies 1102 and 1104 are shown to have the same rotational direction; this does not need to be the case, and in a dual exhaust situation, the two inputs could come from opposite sides of the outer shell (not shown) and rotate in opposite directions.

There may be designs where a rotational direction may allow a portion of the circulating flow to easily enter into the gaps between vanes; direct path into the gaps without the need to reverse directions before entering the gaps as previously described. In this case, the majority of flow would continue to rotate and expand radially outward due to centripetal acceleration in the outer circulation region, and only a portion would enter into the gaps 1116 at a higher velocity to create a stronger vortex in the inner circulation region 1118.

Figure 12:
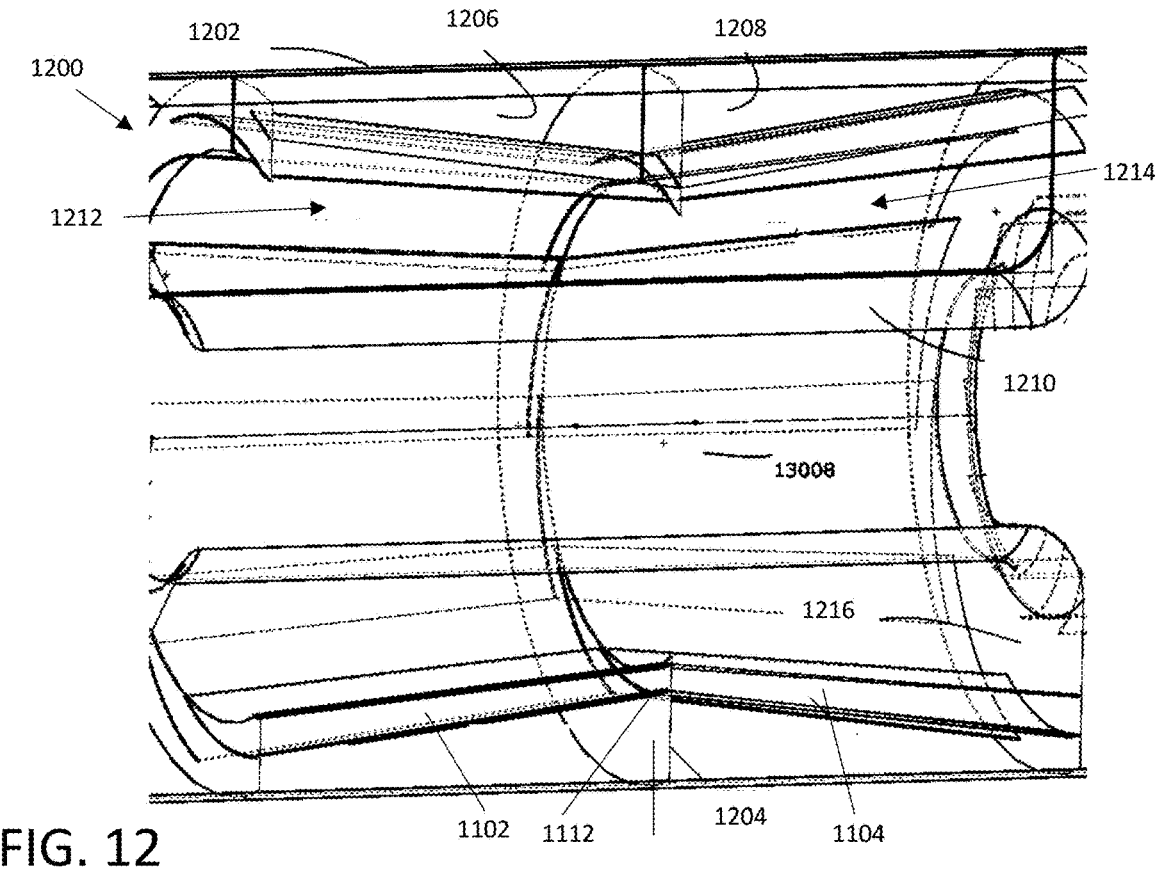
FIG. 12 depicts a muffler embodiment that utilizes the twin overlapping vane assemblies of FIG. 11.

FIG. 12 depicts an embodiment that utilizes the twin overlapping vane assemblies 1102 and 1104 of FIG. 11. Specifically, FIG. 12 depicts a cross-sectional view of a muffler 1200 comprising an outer wall 1202 defining an enclosure in which the vane assemblies 1102 and 1104 are supported by a separation ring 1204. The separation ring is annular and extends from the junction 1112 between the assemblies 1102 and 1104 to the outer wall 1202. The space between the outer wall 1202 and the assemblies 1102 and 1104 forms tapered outer circulation regions 1206 and 1208.

Coaxial with and inside the vane assemblies 1102 and 1104 is positioned an interior cylindrical pipe 1210. The space between the vane assemblies 1102 and 1104 and the pipe 1210 form inner circulation regions 1212 and 1214. As described previously with respect to FIG. 11, once the flow is rotating in the outer circulation regions 1206 and 1208, the portions of the flow nearest the vane assemblies 1102 and 1104 enters the vane gaps 1116 and create rotational flow in the opposite direction within the inner chamber regions 1212 and 1214. The inner circulating flow region 1212 and 1214 combine in the space between the vane assemblies 1102 and 1104 and the interior cylindrical pipe 1210 until the pressures equalize and the combined flow is forced to the distal end 1216 of the inner circulation chamber 1214. The exhaust flow egress location is at the distal end 1216. Alternatively, the exhaust egress location may be at the opposite end of the inner circulation chamber 1214 or a combination of two or more egress ports. The inside of the interior cylindrical pipe 1210 can be used as a passageway to transfer exhaust from one end of the muffler to the other, or to connect different components within a multi-stage muffler assembly. Alternatively, in another embodiment, the pipe 1210 could be replaced with another set of overlapping vanes to create a new innermost circulation region.

Figure 13:
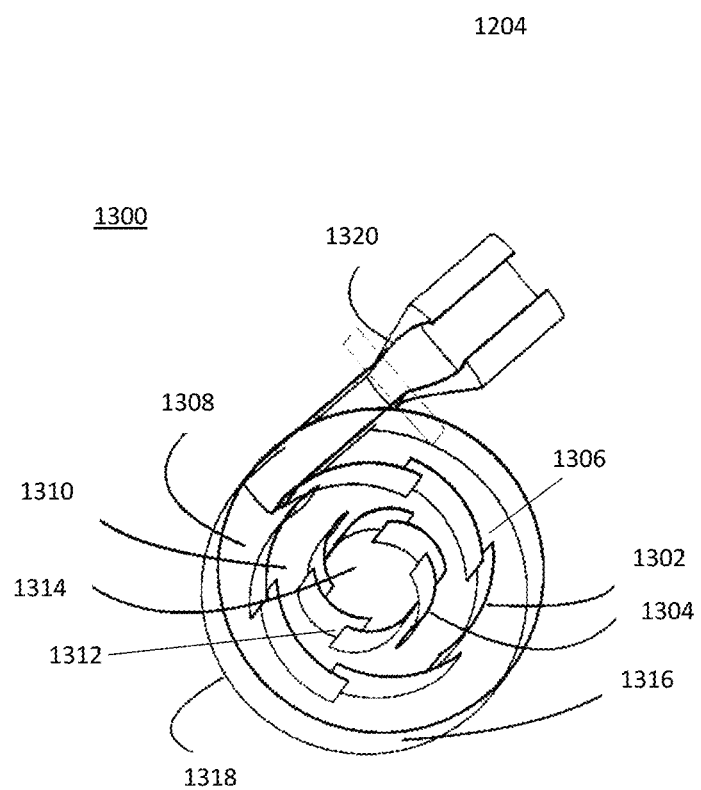
FIG. 13 depicts a cross section of a muffler embodiment comprising nested vane assemblies.

The exhaust flow director of any muffler embodiment may be assembled from an assortment of vane assembly structures. For example, FIG. 13 depicts a cross section of a muffler 1300 comprising nested vane assemblies (an outer vane assembly 1302 and an outer vane assembly 1304). The nested vane assemblies 1302 and 1304 are housed within an enclosure defined by an outer wall 1316 and a bottom cover plate 1318 (the top cover is shown as removed). An exhaust input plenum 1320 causes the exhaust gasses to tangentially impact the wall 1316 and enter an outer circulation region 1308. The wall 1316, the bottom cover plate 1318 and upper cover plate (not shown) are sealed, for example, by welding, to another to enclose the vane assemblies 1302 and 1304. The upper cover plate comprises the exhaust egress port near the center of the inner vane assembly 1304.

In the depicted embodiment, the outer vane assembly 1302 and the inner vane assembly 1304 have opposing rotational orientations. The orientation of the overlapping outer vane gaps 1306 on the outer vane assembly 1302 promote prolonged CCW rotating flows in the outermost first circulation region 1308, and these CCW flows must change direction to enter into the outer vane gaps 1306, to create CW circulation in the second circulation region 1310 after passing through the outer vane gaps 1306. Once a significant portion of the flows are contained in the second circulation region 1310 between the outer vane assembly 1302 and the inner vane assembly 1304, and circulating in a CW rotational direction in this second circulation region 1310, both vane assemblies 1302 and 1304 promote prolonged CW circulation within the inner second circulation region 1310. As before, flows from the second circulation region 1310 entering and passing through the inner assembly gaps 1312 will again reverse rotational direction to CCW, and all of the inner vane assembly gaps 1312 reinforce each other to maintain a CCW vortex inside the innermost third circulation region 1314. Egress from this innermost circulation region 1314 comprises at least one pipe with an opening or perforations located in proximity to the center of the third circulation region 1314; although not depicted in FIG. 13, this egress could be an opening or perforations through the bottom cover 1318, through the top cover (not shown), or through a combination of both locations.

In alternative embodiments, at least one pipe could be located at one or more positions, not necessarily at the center of the egress cover plate, to create diverse sampling of the vortex flows. For example, an independent egress pipe could be located in each of the two innermost circulation regions 1310 and 1314. The plurality of egress pipes from this one muffler embodiment 1300 may be connected to other muffler components or be combine in a single circulation chamber through multiple tangential inputs around the perimeter of a circulation region.

Figure 14:
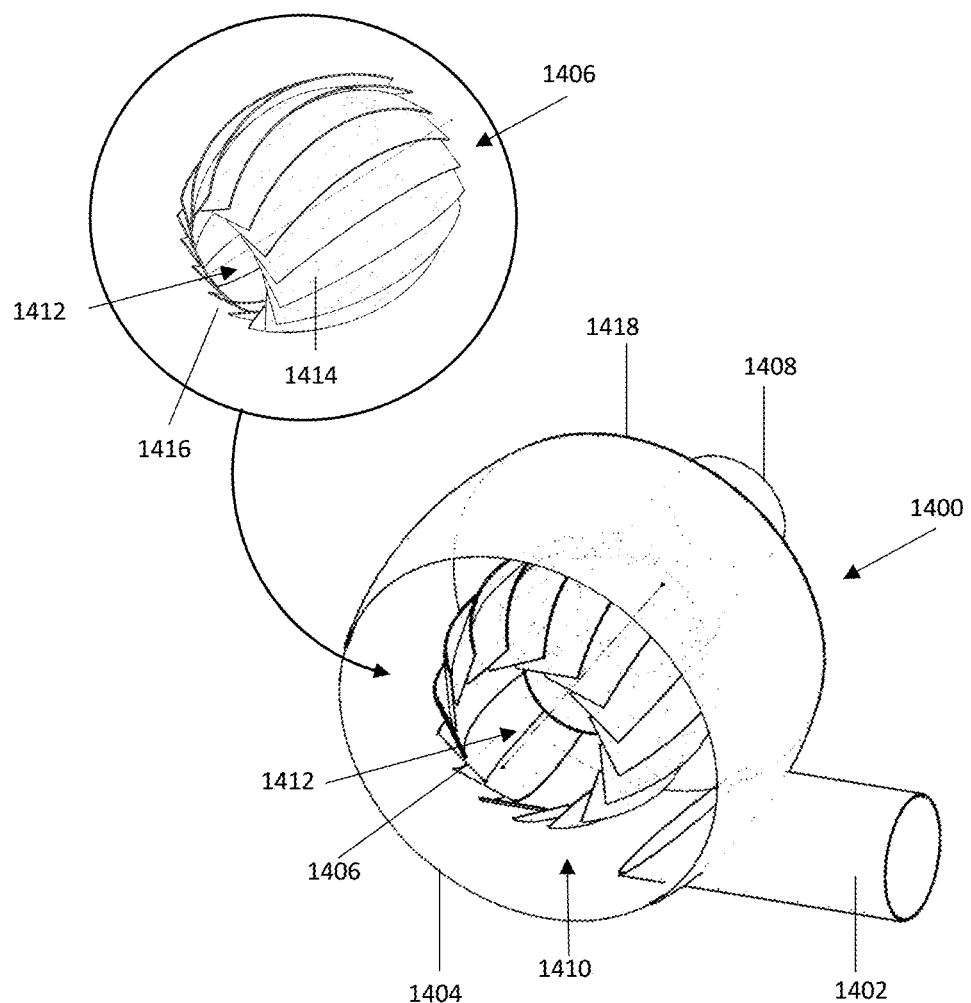
FIG. 14 depicts a cross section of a muffler embodiment having an exhaust flow director comprising a spherical overlapping vane assembly.

FIG. 14 depicts a cross-sectional view of an embodiment of a muffler 1400. The muffler comprises an exhaust input pipe 1402, an outer shell 1404, an overlapping vane assembly 1406 and an exhaust egress pipe 1408. The muffler 1400 comprises a front (removed in FIG. 14) and an annular, egress cover plate 1418 are attached to the housing to form a sealed muffler enclosure. The outer shell 1404 may be cylindrical or spherical. The overlapping vane assembly 1406 is mounted centrally with the outer shell 1404 to define an outer circulation region 1410 and an inner circulation region 1412 for the exhaust gasses as they pass through the muffler 1400.

The overlapping vane assembly 1406 (an exhaust flow director) comprises a plurality of overlapped vanes 1414 having complex curvatures. Each vane 1414 is spaced apart from an adjacent vane to form a gap 1416. In this embodiment, the overlapped vanes 1414 create a spherical overlapping vane assembly 1406. The exhaust input pipe 1402 tangentially injects exhaust gas into the outer circulation region 1410 outside of the spherically curved overlapping vane assembly 1406. The location and angle of input pipe 1402 can be varied to affect the circulation within the outer circulation region 1410. In the depicted embodiment, flow within the outer circulation region 1410 flows in a CW rotational direction before entering the vane gaps 1416 associated with the spherical overlapping vane assembly 1406, where a change in rotation creates a CCW circulation in the innermost circulation region 1412. The egress cover plate 1418 with egress pipe 1408 protruding in both directions from its surface is parallel to the front plate (not shown for clarity), wherein both plates contact and contain the spherically curved overlapping vane assembly 1406. The optimal location for egress pipe 1408 is along the axial centerline at the center-of-curvature of the vanes in vane assembly 1406.

In various embodiments, the vane assembly 1406 may comprise flat or curved vanes bent using different radii-of-curvatures, various number of vanes, various vane separations and orientations to create unique gap areas along the length of the individual vanes 1414. Multiple spherical overlapping vane assemblies 1406 can also be inserted into a longer cylindrical shell with tangential inputs at various positions along the length of the cylindrical wall; the varying diameters of the spherical overlapping vane assemblies 1406 create correspondingly nonlinear circulation areas outside of one, and in between two adjacent spheres. In another embodiment, an egress pipe with perforations could connect the centers of each spherical inner circulation region 1412 and eventually lead to an egress port for the combined interior flows of multiple overlapping vane assemblies 1406. Alternatively, the opening at one end of one assembly 1406 could be matched in diameter and joined with another spherical assembly 1406 to create an egress path of fluid-coupled inner circulation regions without a pipe egress.

Figure 15:
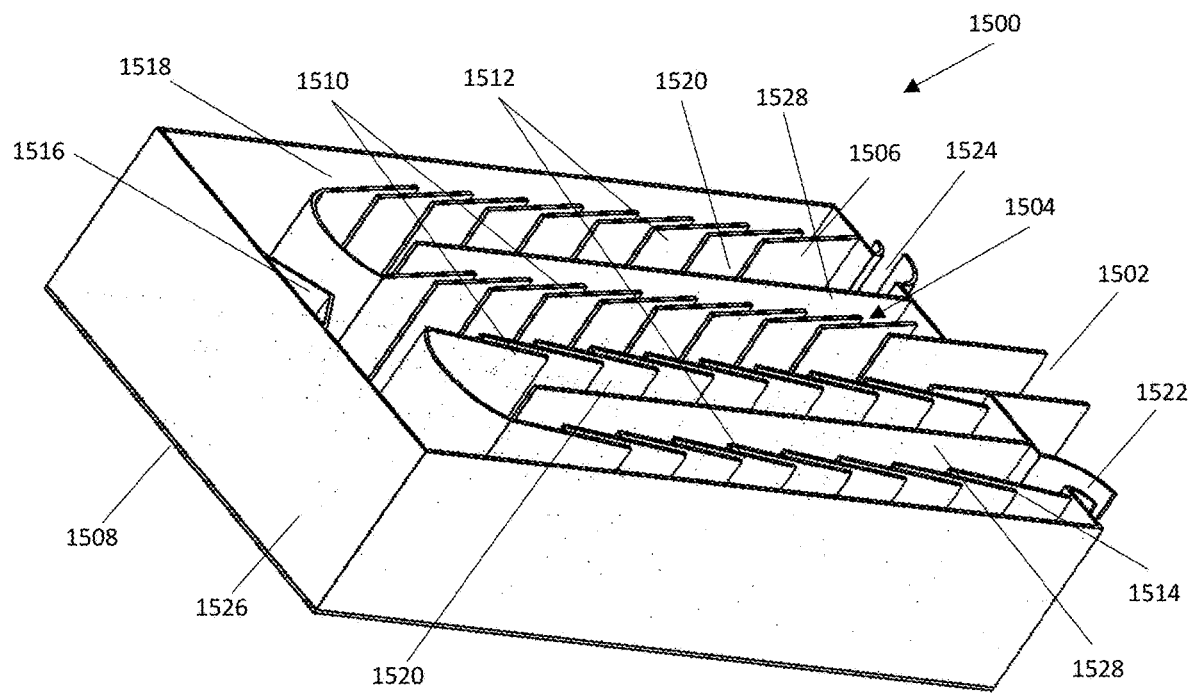
FIG. 15 depicts a cross sectional perspective view of a rectangular muffler embodiment.
Figure 16:
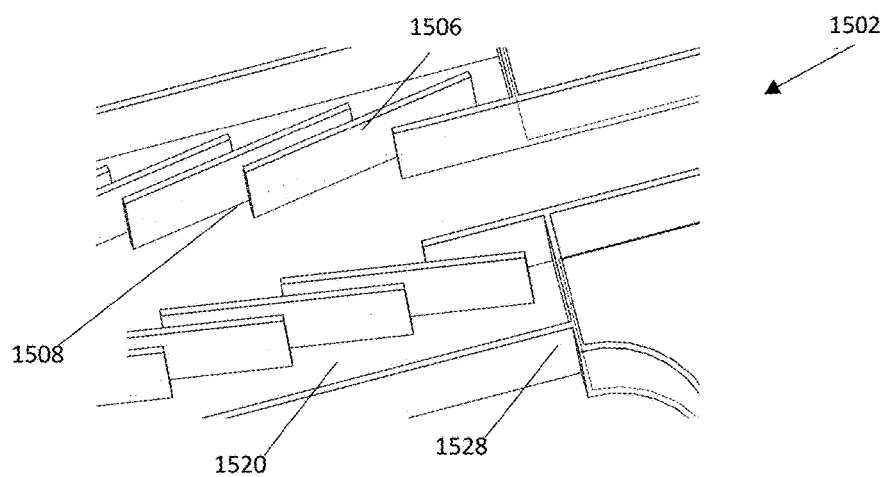
FIG. 16 depicts a close up, perspective view of the input channel of the muffler in FIG. 15.

FIGS. 15 and 16 respectively depict an embodiment of a rectangular muffler 1500 and a close up of an input channel 1502 of the rectangular muffler 1500. To best understand this embodiment, both FIGS. 15 and 16 should be reviewed simultaneously. In this embodiment, the rectangular muffler 1500 does not create, or rely on, circulation or vorticity. The muffler 1500 comprises an exhaust flow director 1504 comprising a plurality of overlapping flat vanes 1506 arranged in four arrays, inner arrays 1510 and outer arrays 1512. In this embodiment, the vanes 1506 are depicted as being flat. In other embodiments, curved vanes or other shapes could be used. More specifically, the muffler 1500 comprises a substantially rectangular outer wall 1526, flat base plate 1508, an identical top cover plate (not shown), an input channel 1502, an exhaust director 1504 comprising four linear arrays of inner flat vane arrays 1510 and outer flat vanes 1512, a multitude of vane gaps 1514 associated with the four linear arrays 1510 and 1512 of flat vanes 1506, a flow splitter 1516, two flow channels 1518 and 1520 (forming first and second flow regions, respectively), and two exit ports 1522 and 1524. The outer wall and the top cover and base plates form an enclosure for the exhaust flow director 1504. Although not a requirement, this embodiment is shown as symmetrical along the centerline between the input channel 1502 and the splitter 1516.

The rectangular input channel 1502 forces exhaust flows past flat vanes 1506. Similar to the generally cylindrical overlapping curved vane descriptions within this description, the flow is deflected past the gaps 1514 to create a low-impedance pathway, and the flow and pressure pulsations must reverse flow direction to pass through gaps 1514 to a secondary flow region 1520. Unlike all previous descriptions that create circulation, vorticity and exploits centripetal acceleration to force flow and pressure pulsations radially outward, this embodiment does not create vorticity but does create a high impedance linear path to limit pressure perturbations reversing direction and entering the secondary flow region 1520 before subsequently flowing to an egress port 1522 or 1524 to exit the muffler 1500.

More specifically, flow and pressure pulsations travel down the input channel 1502, are divided by flow splitter 1516 to the first flow channels 1518 (defined by vane arrays 1512 and the outer wall 1526, and are prevented from further lower-resistance flow at the end of the channels 1518, or the channel's stagnation point. The input channel 1502 and channel 1518 are over-pressurized and therefor force portions of the flow through the vane gaps 1514 of the four linear arrays 1510 and 1512 into the secondary flow channels 1520 (defined by a pair of arrays 1510 and 1512 and an interior wall portion 1528 that bisects the space between the arrays 1510 and 1512); however, the gap orientations force a change in direction for the flows to travel through the gaps and propagate in the flow channel 1520 in a direction away from the ultimate exit ports 1522 and 1524. This path confusion allows additional pressure wave expansions, phased cancellations and flow averaging to create acoustic attenuation. The channel 1520 is bifurcated by a wall 1528 to direct the flows along the channel 1520 towards the two exit ports 1522 and 1524. The pressure and flow impedance of each vane gap 1514 along the channel input 1502 and channels 1518 and 1520 are slightly different due to the flow, velocity and pressure distributions leading to channel termination. It is obvious that the fin gap dimensions, and vane shapes can be modified to tailor the flow distribution into the secondary flow channel 1520. These channels are shown in a linear layout, but could be any circuitous path with more than one branch.

Figure 17:
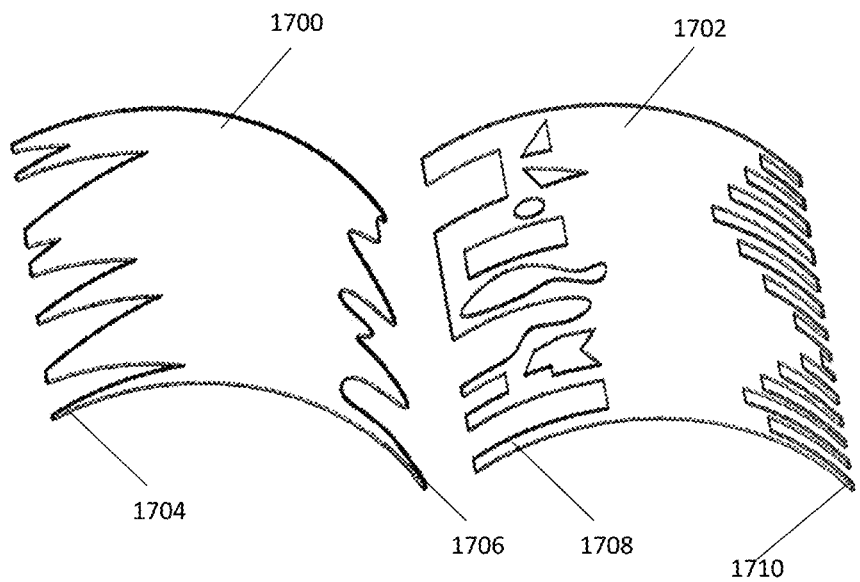
FIG. 17 depicts exemplary embodiments of vanes having edge textures.

In any of the foregoing embodiments, in order to further break up coherent expansions of pressure pulsations or flow variances, distorted edge vanes are designed to arbitrarily or uniformly distort the expanding pressure waves that travel over the vane surfaces and through the gaps between adjacent vanes. The non-linear expansion areas create a variable impedance for the pressure expansion and can contribute to phased cancellation of acoustics. Any combination of edge features may be created, and typically, the more diversity from vane to vane, the better the destructive attenuation and waveform disruption. Some exemplary embodiments of vanes 1700 and 1702 having vane edge textures are depicted in FIG. 17. The depicted embodiments of vanes 1700 include random linear 1704 and curvilinear 1706, while vane 1702 includes diverse shapes 1708 and predictable distribution of varying areas 1710.

Figure 18:
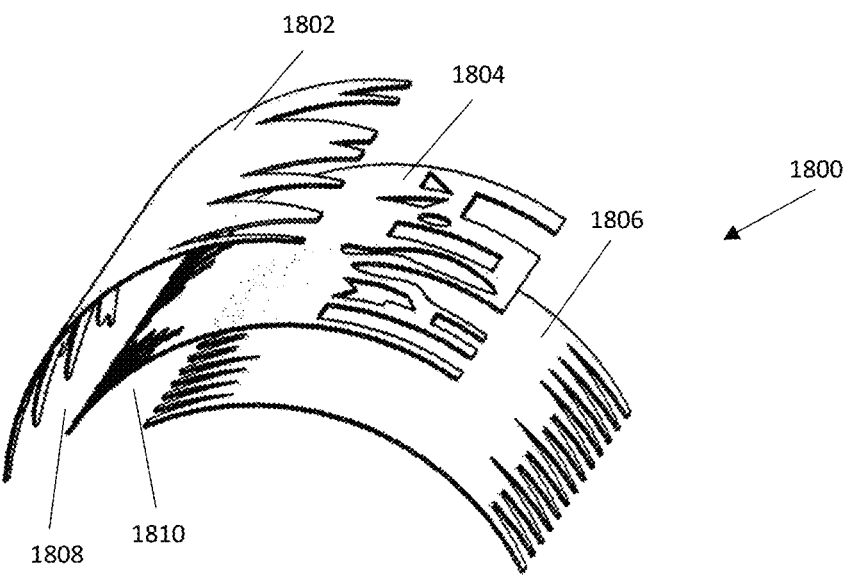
FIG. 18 depicts an embodiment of an exhaust flow director comprising vanes having disrupted edges.

FIG. 18 depicts additional embodiments of three disrupted edge vanes 1802, 1804 and 1806 in an overlapped configuration that forms a portion of an exhaust flow director 1800. The vane gaps 1808 and 1810 are shown as having uniform separation, but they can also be variable apertures of differing spacing if desired. CW flow over the convex side of vane 1802 will variably expand to hit the solid surface of vane 1804 before passing over the disrupted edge of vane 1804 which then expands onto the solid surface of vane 1806 before hitting the disrupted edge of vane 1806. The gap 1808 is formed between the concave surface of vane 1802 and the concave surface of vane 1804. As flow reverses direction within each of these gaps 1808 and 1810, the portion of flow within each gap passes in a CCW direction over the interior portions of the disrupted edge vanes with similar effects as described above.

In another alternative embodiment vanes can also be made of partially or completely perforated metal to permit micro-scale pressure expansions throughout the entire surfaces of each vane. The size, number and spacing of these perforations determines the surface's acoustic impedance and flow resistivity; combinations of diverse perforated vanes can add more complex pressure expansions and flow diffusion between adjacent vanes and adjacent circulation regions throughout the muffler system. High acoustic and flow resistance will still allow the circulating flow characteristics describe throughout this disclosure.

Fiberglass batting materials contained between two perforated surfaces or between at least one perforated surface and another solid surface is well known to those skilled in the art of muffler design, and can be incorporated into many of the embodiments described in this invention.

While the foregoing is directed to embodiments of the present invention, other and further embodiments of the invention may be devised without departing from the basic scope thereof, and the scope thereof is determined by the claims that follow.

What is claimed is:
1. Apparatus for attenuating a sound level comprising:
an enclosure comprising an inlet and an outlet; and
a pair of tapered twin overlapping vane assemblies formed in an irregular hexagon shape an exhaust flow director, positioned within the enclosure and fluidly coupled to the inlet and the outlet, comprising a plurality of overlapping vanes wherein the plurality of overlapping vanes are disposed inside said twin overlapping vane assemblies and direct exhaust flow into regions having counter directed flow directions wherein the enclosure has a circular cross section and the plurality of overlapping vanes are formed in a circular pattern within the enclosure to form a first circular region and a second circular region, where exhaust flow in the first circular region is counter-clockwise and exhaust flow in the second circular region is clock-wise, or vice versa wherein the exhaust inlet comprises a plenum for directing the exhaust flow tangential to the first circular region wherein the outlet is proximate a center of the second circular region wherein each vane in the plurality of overlapping vanes are spaced from each adjacent vane to form a gap through which exhaust flows wherein the gap is uniform or non-uniform wherein the vanes are flat or curved wherein the enclosure is circular or rectangular wherein the plurality of overlapping vanes are arranged in a conical pattern said conical patterns formed in an irregular hexagon shape of said tapered twin overlapping vane assemblies.

\* \* \* \* \*